United States Patent Office 3,511,749
Patented May 12, 1970

3,511,749
POLYAMIDE COMPOSITE FILAMENT HAVING A LATENT HIGHLY ELASTIC AND HIGHLY RECOVERABLE CRIMP
Fumimaro Ogata, Nishinomiya, and Katsuhiko Nagamine, Settsu, Osaka-fu, Japan, assignors to Kanegafuchi Boseki Kabushiki Kaisha and Snia Viscosa Societa Nazionale Industria Applicazioni Viscosa S.p.A., Tokyo, Japan, and Milan, Italy
No Drawing. Filed Oct. 24, 1967, Ser. No. 677,734
Claims priority, application Japan, Nov. 1, 1966, 41/72,053
Int. Cl. D02g *3/36*
U.S. Cl. 161—175    9 Claims

ABSTRACT OF THE DISCLOSURE

Production of composite filament having a latent highly elastic and highly recoverable crimp, in which two different thermoplastic synthetic polymers are separately melted and spun simultaneously through a common orifice to form a unitary filament, in which said two polymers are disposed in an eccentric relation as distinct filamentary components along the entire length of the filament, comprising one of said components being homopolyamide and the other of said components being copolyester obtained by copolymerizing the polyamide with a mixture of a lactone, and ω-aminoalcohol and a dibasic acid or a mixture of the lactone, a diamine and the dibasic acid.

---

The present invention relates to a method of producing polyamide composite filaments in which a homopolyamide polymer and a copolymer of polyamide with polyesteramide are melted separately and then spun simultaneously from a common spinneret orifice to form a unitary filament, the resulting filament is drawn, whereafter the drawn filament is subjected to a shrinking or swelling treatment to develop crimps having excellent elasticity and crimp recovering property.

Various processes of producing composite filaments having latent crimpability by spinning different synthetic polymers simultaneously through a common orifice to form a unitary filament wherein said polymers are disposed eccentrically as district filamentary components along the length of the filament have hitherto been proposed. The primary object for producing composite filaments is to provide readily crimped fibers having bulkiness, covering power, elasticity and crimp recovering property as wool by subjecting said composite filament to such a treatment as swelling, wetting or heating to develop three dimensional spiral crimps on said filament.

However, most of conventional composite filaments have not always been provided with wool-like properties completely and there have been further points to be improved. For example, conventional polyamide composite filaments have generally lower initial modulus and hygroscopicity than those of wool, so that said filaments have not been satisfactory particularly in the use for garments. Furthermore, the wool has an excellent crimp recovering property, by which the original crimped state can be restored by a shrinking or swelling treatment even after compressing, stretching and bending under a high load, while conventional polyamide composite filaments have little crimp recovering property as shown in said wool.

In order to improve said crimp recovering property, a composite filament consisting of a blended polymer of a polyamide with a hydrophilic polymer and a polyamide, which is hydrophobic polymer, has been disclosed in Japanese patent application publication No. 19,214, 1961 (U.S. Pat. No. 3,038,239). Said blended polymer is obtained by mixing hydrophilic polymer, such as, poly-N-vinyl pyrrolidone with hydrophobic polyamide polymer, which is not a chemically bonded product, i.e., a copolymer of the hydrophilic polymer and the hydrophobic polymer, so that the composite filament obtained by conjugate spinning said blended polymer with polyamide develops crimps only due to difference in shrinkabilities between the polyamide and the blended polymer, and therefore the crimpability is poor, and further the hydrophilic polymer is extracted gradually when the composite filament is dipped in water repeatedly, whereby the crimp developability lowers. Moreover, it is difficult to homogeneously mix said hydrophilic polymer with said hydrophobic polymer in a heat-melting process.

Furthermore, in order to obtain the composite filament having such a high elasticity as in wool, it has been proposed to use an aromatic polyamide or polyester as one component of the composite filament, but all these composite filaments lacks in hygroscopicity as well as in crimp recovering property.

The object of the present invention is to improve the above described drawbacks and difficulties of the conventional composite filaments and to provide a crimped composite filament having wool-like properties in which initial modulus, hygroscopicity and cirmp recovering property are excellent.

The present invention consists in a method of producing composite filaments, in which two different thermoplastic synthetic polymers are separately melted and then simultaneously spun through a common spinneret orifice to form a unitary filament in which said two polymers are disposed in an eccentric relation as distinct filamentary components along the entire length of the filament, characterized in that one of said components is homopolyamide and the other of said components is copolyesteramide obtained by copolymerizing the polyamide with 0.1 to 20% by weight based on the polyamide, of a mixture of lactone having the general formula

wherein $R_1$ is a saturated aliphatic hydrocarbon having 4 to 7 carbon atoms, ω-aminoalcohol having the general formula

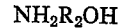
$$NH_2R_2OH$$

wherein $R_2$ is a saturated aliphatic hydrocarbon, aromatic nucleus or alicyclic nucleus having 2 to 15 carbon atoms, and dibasic acid or its derivative having the general formula

$$R_3OOCR_4COOR_5$$

wherein $R_3$ and $R_5$ are hydrogens or lower hydrocarbons and $R_4$ is a saturated aliphatic hydrocarbon, aromatic nucleus or alicyclic nucleus having 1 to 12 carbon atoms, in a mole ratio of 1:1:1, or a mixture of the above described lactone, diamine having the general formula

$$NH_2R_6NH_2$$

wherein $R_6$ is a saturated aliphatic hydrocarbon, aromatic nucleus, alicyclic ring or piperazine ring having 2 to 12 carbon atoms, and the above described dibasic acid or its derivative in a mole ratio of 2:1:1.

As the homopolyamides to be used in the present invention, mention may be made of aliphatic polyamides, such as, poly - ε - caprolactam, polyhexamethylenedipamide, polyhexamethylenesebacamide, polyenantholactam, poly-ω - aminoundecylic acid, poly - ω - aminolauric acid, etc. and aromatic polyamides, such as, polymetaxylyleneadipamide, polymetaxylylene decamethylenedicarbonamide, polyparaxylyleneadipamide, polyhexamethyleneterephthalamide, polyundecamethyleneterephthalamide, etc.

Furthermore, the lactone to be used in the present invention involves butyrolactone, caprolactone, enantholactone, capryllactone, etc.

As the above described ω-amino alcohols, mention may be made of ethanolamine, ω - aminobutanol, ω - aminopentanol, ω - aminohexanol, ω - aminodecanol, p - aminobenzyl alcohol, p - aminophenethyl alcohol, 4 - aminocyclohexanol, etc.

As the above described dibasic acids or the derivatives thereof, mention may be made of malonic acid, succinic acid, adipic acid, suberic acid, azelaic acid, sebacic acid, undecamethylene dicarboxylic acid, terephthalic acid, isophthalic acid, hexahydroterephthalic acid, p,p' - diphenyl dicarboxylic acid, p,p' - diphenylmethane dicarboxylic acid, and monoester or diester derivatives thereof, such as monomethylester, monoethylester, monopropylester, monoamylester, dimethylester, diethylester, dipropylester, diamylester, etc.

As the above described diamines, mention may be made of ethylenediamine, hexamethylenediamine, nonamethylenediamine, decamethylenediamine, m - xylylenediamine, p - xylylenediamine, para - diaminocyclohexane, piperazine, etc.

The mixture consisting of the above each three starting materials to be used in the present invention is itself a starting material for forming polyesteramide. When the lactone, the ω - amino alcohol and the dibasic acid or the derivative thereof are used, the lactone firstly reacts on the ω - amino alcohol to form monoamidodiol, and then an esterification reaction between the resulting monoamidodiol and dibasic acid or the derivatives thereof proceeds, while the copolymerization reaction between the polyamide and thus formed polyesteramide forming ingredients takes place. Furthermore, when the lactone, the diamine and the dibasic acid or the derivatives thereof are used, the lactone firstly reacts on the diamine to form diamidodiol as described above, and then an esterification reaction between the resulting diamidodiol and dibasic acid or the derivatives thereof proceeds, while the copolymerization reaction takes place. Therefore, the copolymer consisting one component of the composite filament obtained according to the present invention may be produced by using such a monoamidodiol or diamidodiol as described above which has been prepared in advance, instead of using the lactone and the ω-amino alcohol or the lactone and the diamine, as the starting material.

Moreover, the polyesteramide forming ingredients to be used for preparing the copolymer components according to the present invention may be a mixture of the ingredients consisting of the lactone, the ω-amino alcohol and the dibasic acid or the derivatives thereof with the ingredients consisting of the lactone, the diamine and the dibasic acid or the derivatives thereof.

Furthermore, as polyamides which can be copolymerized with said polyesteramide forming ingredients, mention may be made of various copolyamides, such as, poly-ϵ - capramide/polyhexamethyleneadipamide, polyhexamethyleneadipamide/polyhexamethylenesebacamide, poly-ϵ - capramide/polyhexamethyleneisophthalamide, poly - ϵ-capramide/polyhexamethyleneterephthalamide, poly - ϵ-capramide/polymetaxylyleneterephthalamide, etc., in addition to the above described aliphatic and aromatic homopolyamides.

Homopolyamide and copolyesteramide to be used in the present invention can easily be prepared by heating and copolymerizing the starting materials for said polymers under an inert gas atmosphere at an increased pressure, atmospheric pressure or reduced pressure, if necessary, according to a conventional publicly known process of producing polyamide. Said polymers used in the present invention may be admixed with the additives such as delustrant, pigment, light-stabilizer, heat-stabilizer, antistatic agent, etc.

The ratio of polyesteramide forming ingredients contained in copolyesteramide to be used in the present invention is preferably at most 20% by weight. When said ratio is more than 20% by weight, there occurs such difficulties that the rate of copolymerization reaction with polyamide lowers extremely and the resulting copolymer is colored, so that it is hard to obtain the copolymer having a desirable fiber-forming ability and a satisfactory quality. Furthermore, when the copolyesteramide is prepared by copolymerizing the polyesteramide forming ingredients with a copolyamide the ratio of copolymeric ingredient in the copolyamide is preferably less than 20% by weight. When said ratio is more than 20% by weight, the yarn property is deteriorated owing to lowering of melting point and considerable decrease of crystallinity and the like, which are disadvantageous in the conventional copolyamides and therefore such a ratio is not desirable. Thus, the copolyamide having ester linkage and amide linkage in its main molecular chain and hydroxyl group, amine group and carboxyl group as its terminal groups is excellent in initial modulus and hygroscopicity, so that the composite filament obtained by melting said copolymer and homopolyamide separately and then conjugate spinning the melted polymers through a common orifice of a conventional spinnerette for conjugate spinning in such a manner that those two polymers are arranged in an eccentric relation with each other in the cross-section of a filament, is excellent in adhesive property of the two components and is high in initial modulus and further has excellent hygroscopicity as well as a high crimpability. When the composite filament thus obtained, after drawn, is subjected to such a treatment as swelling, wetting or heating, it can readily develop spiral three dimensional crimps having an excellent elasticity and the filament thus obtained has such a wool-like crimp recovering property that crimps fatigued by repeated application of compression, stretching or bending stress thereto, can recover easily the original crimp by subjecting to a shrinking or swelling treatment again.

The ratio by weight of two polymers to be melt-extruded and bonded in the process of the present invention may be determined in a suitable manner depending upon the purpose. Furthermore, the arrangement of the two polymers in the cross-section of the filament may be either in a side-by-side or eccentric core and sheath relation. Moreover, a crimp developing treatment can be effected in any step before or after the production of knitted or woven fabrics. The composite filament thus obtained according to the present invention is the crimped fiber having wool-like property, so that said composite filament can be utilized in a far broader field for garments and industries than conventional crimped fibers.

The invention will be explained in detail with reference to the following examples. "Part" in the examples means part by weight.

Furthermore, the determination of the wet curliness, dry curliness and crimp recovering property as shown below were made as follows:

(1) *Wet curliness.*—The bundle of forty filaments is cut into 30 cm. length, which is dipped in boiling water for 15 minutes under a load of 0.1 mg./d. The wet curliness is shown by the percentage (percent) of the loss of the apparent length of the wet filament in the dipped state based on the original length of the filament.

(2) *Dry curliness.*—The filament determined in the above paragraph (1) is air-dried to develop crimps. The dry curliness is shown by the percentage (percent) of the loss of the apparent length of the filament based on the original length of the filament prior to a dipping treatment.

(3) *Crimp recovering percentage.*—When to the filament developed crimps through the above paragraphs (1) and (2) is applied a load of 0.1 mg./d. for one minute, the length of the filament $a$ is determined. Then a load of 0.5 g./d. is further applied to the filament for one minute and thereafter the load of 0.5 g./d. only is removed and the filament is dipped in boiling water for 15 minutes again and then dried. The cycle of the above procedure is repeated 5 times. The length $b$ when the filament is air-dried under a load of 0.1 mg./d. after the five cycles and the length c when the load of 0.5 g./d. is applied against to the filament are determined.

$$\text{Crimp recovering percentage} = \frac{c-b}{c-a} \times 100 \text{ (percent)}$$

EXAMPLE 1

Ninety three parts of caprolactam, 7 parts of a mixture of caprolactone, hexamethylene diamine and terephthalic acid in a mole ratio of 2:1:1, 5 parts of water and 0.1 part of acetic acid were charged into an autoclave, and air in the autoclave was purged with nitrogen gas, and then the mixture was subjected to prepolymerization at a temperature of 260° C. under a pressure of 2 kg./cm.² gauge for 3 hours, and further the polymerization was continued by reducing the pressure to an atmospheric pressure at the same temperature for 5 hours and then completed by heating at the same temperature for 3 hours under reduced pressure of 50 mm. Hg. The copolymer thus obtained was formed into chips and the chips were washed with water and dried. The copolymer chips had an intrinsic viscosity $[\eta]$ of 1.06 (in m-cresol at 30° C.) and a melting point of 211° C.

Furthermore, 100 parts of caprolactam, 5 parts of water and 0.25 part of acetic acid were polymerized under the same conditions as described above, except that the above described polyesteramide forming ingredients were not used, then the resulting nylon-6 was formed into chips and the chips were washed with water and dried. The nylon-6 chips had an intrinsic viscosity $[\eta]$ of 1.12 and a melting point of 216° C.

Said copolymer chips and nylon-6 chips were melted separately and the melts were extruded simultaneously from a common spinnert orifice in a side-by-side relation at a temperature of 260° C. in an extrusion ratio (by weight) of 1:1 and the resulting composite filament was drawn 4.2 times its original length at a room temperature to obtain a unitary filament of 15 deniers.

The composite filament thus obtained, after a crimp developing treatment, had an excellent properties such as a tensile strength of 4.4 g./d., an elongation at break of 31.8% and an initial modulus of 20.1 g./d.

Furthermore, such filament had a dry curliness as excellent as 80.2% and a wet curliness as low as 52.6%, so that the filament had a crimp recovering percentage as high as 88.1%.

To make the comparison with the composite filament according to the present invention, polycapramide/polyhexamethyleneterephthalamide copolymer (6/6T) having an intrinsic viscosity $[\eta]$ of 1.17 and a melting point of 208° C., which was obtained by copolymerizing under the same conditions as described above, except that hexamethylene-diammoniumterephthalate was used instead of said polyesteramide forming ingredients and 0.21 part of acetic acid was used, and said nylon-6 were conjugate spun and drawn in the same manner as described above to obtain a unitary filament of 15 deniers. Said filament, after a crimp developing treatment, had a tensile strength of 4.2 g./d., an enlongation at break of 32.5% and an initial modulus of 16.2 g./d.

Furthermore, the dry curliness of the above filament was 71.2%, which was inferior to that of the filament according to the present invention, and the wet curliness of the filament was 64.1% and the difference between said dry curliness and the wet curliness was small, so that crimp recovering property, after effecting repeated cycles of a wetting treatment and drying treatment, was 73.4%.

EXAMPLE 2

Ninety-two parts of caprolactam, 5 parts of water, 8 parts of a polymer forming material selected from the following five groups, 0.3 part of titanium dioxide and a suitable amount of acetic acid were copolymerized under the same polymerization conditions as described in Example 1 to obtain five copolymers having an intrinsic viscosity $[\eta]$ of 1.07, respectively.

Polymer forming material (A) A mixture of caprolactone, ethanolamine and terephthalic acid in a mole ratio of 1:1:1
(B) A mixture of caprolactone, p-xylylenediamine and isophthalic acid in a mole ratio of 2:1:1
(C) A mixture of butyrolactone, ethylenediamine and adipic acid in a mole ratio of 2:1:1
(D) p-Xylyenediammonium-isophthalate
(E) A mixture of (B) and (D) in an equal amount One sort of chips of said five copolymers and nylon-6 chips used in Example 1 were melted separately and the melts were extruded simultaneously from the common spinneret orifice in an eccentric core and sheath relation in an extrusion ratio by weight of 1:1, wherein the copolymer component was arranged in the core portion and nylon-6 component was arranged in the sheath portion to form a composite filament, which is then drawn in the same manner as described in Example 1 to obtain a unitary filament of 15 deniers.

When each composite filament thus obtained was subjected to a shrinking treatment, the fiber properties and the crimp properties are shown in the following:

| Used copolymer | A | B | C | D | E |
|---|---|---|---|---|---|
| Tensile strength (g./d.) | 4.7 | 4.7 | 4.6 | 4.5 | 4.6 |
| Elongation at break (percent) | 29.8 | 28.7 | 30.3 | 31.6 | 31.0 |
| Initial modulus (g./d.) | 21.1 | 20.9 | 19.3 | 16.2 | 18.3 |
| Dry curliness (percent) | 81.6 | 83.4 | 81.1 | 76.4 | 78.9 |
| Wet curliness (percent) | 43.1 | 44.7 | 42.0 | 52.2 | 49.5 |
| Crimp recovering percentage | 89.3 | 88.6 | 89.0 | 69.3 | 75.4 |

As seen from the above table, the composite filaments A, B, C and E according to the present invention were more excellent in initial modulus and dry curliness than the conventional composite filament D and further in wet state the crimp disappeared and there was little entanglement between mutual filaments, so that when said filament was dried again, the original crimp was recovered and crimp recovering property was excellent, so that said filament had woolly touch and texture.

EXAMPLE 3

Ninety five parts of hexamethylene-diammonium adipate, 10 parts of water, 5 parts of a mixture of caprolactone, hexamethylenediamine and isophthalic acid in a mole ratio of 2:1:1 and 0.3 part of acetic acid were charged into an autoclave and copolymerized at a temperature of 250° C. under pressure of 6 kg./cm.² for 2 hours and then the temperature was raised to 270° C. in one hour, and thereafter the pressure was decreased to an atmospheric pressure. Then the reaction mass was heated at the same temperature under nitrogen gas atmosphere for 3 hours and then further heated at the same temperautre under reduced pressure of 100 mm. Hg for 2 hours to complete the copolymerization.

The copolymer thus obtained had an intrinsic viscosity $[\eta]$ of 1.10 and a melting point of 240° C.

Said copolymer chips and nylon-66 chips having an intrinsic viscosity $[\eta]$ of 1.10 which was obtained by effecting the polymerization under the same condition as described above, except that 100 parts of hexamethylenediammonium adipate were used and the polyesteramide forming ingredients were not used, were melted separately and the melts were extruded simultaneously from the common spinneret orifice in a side-by-side relation at a temperautre of 280° C. in an extrusion ratio (by weight) of 1:1 and the resulting filament was hot drawn 4.0 times its original length at a temperature of 60° C. to obtain a composite filament of 15 deniers.

Said composite filament, after crimp developing treatment, had an initial modulus as very high as 32.4 g./d. and a dry curliness as excellent as 81.6% and a crimp recovering percentage of 89.4%.

What we claim is:

1. A drawn composite filament having an ability for developing excellent elastic and highly recoverable crimps upon a crimp-developing treatment, in which two different thermoplastic synthetic polymers are disposed in an eccentric relation as distinct filamentary compoents along the entire length of the filament, characterized in that one of said components is homopolyamide and the other of said components is copolyesteramide obtained by copolymerizing the polyamide with 0.1 to 20% by weight based on the polyamide, of a mixture of lactone having the general formula

wherein $R_1$ radical is a saturated aliphatic hydrocarbon having 4 to 7 carbon atoms, ω-aminoalcohol having the general formula $$NH_2R_2OH$$

wherein $R_2$ radical is a saturated aliphatic hydrocarbon aromatic nucleus or alicyclic nucleus having 2 to 15 carbon atoms, and dibasic acid or its derivative having the general formula $$R_3OOCR_4COOR_5$$

wherein $R_3$ and $R_5$ radicals are hydrocarbons or lower hydrocarbon radicals having 1 to 5 carbon atoms and $R_4$ radical is a saturated aliphatic hydrocarbon, aromatic nucleus or alicyclic nucleus having 1 to 12 carbon atoms, in a mole of 1:1:1, or a mixture of the above-described lactone, diamine having the general formule $$NH_2R_6NH_2$$

wherein $R_6$ radical is a saturated aliphatic hydrocarbon, aromatic nucleus, alicyclic ring or piperazine ring having 2 to 12 carbon atoms, and the above-described dibasic acid or its derivative in a mole ratio of 2:1:1, or a mixture of the ingredients consisting of the lactone, the ω-aminoalcohol and the dibasic acid or the derivatives thereof with the ingredients consisting of the lactone, the diamine and the dibasic acid or the derivatives thereof.

2. The drawn composite filament according to claim 1, wherein said homopolyamide is selected from the group consisting of poly - ε - caprolactam, polyhexamethyleneadipamide, polyhexamethylenesebacamide, polyenantholactam, poly - ω - aminoundecylic acid, poly-ω-aminolauric acid, polymetaxylylene - adipamide, polymetaxylylenedecamethylene - dicarbonamide, polyparaxyleneadipamide, polyhexamethylene - terephthalamide and polyundecamethyleneterephthalamide.

3. The drawn composite filament according to claim 1 wherein said lactone is selected from the group consisting of butyrolactone, caprolactone, enantholactone and capryllactone.

4. The drawn composite filament according to claim 1, wherein said ω-aminoalcohol is selected from the group consisting of ethanolamine, ω - aminobutanol, ω - aminopentanol, ω - aminohexanol, ω - aminodecanol, p-aminobenzyl alcohol, p - aminophenethyl alcohol and 4-aminocyclohexanol.

5. The drawn composite filament according to claim 1, wherein said dibasic acid and the esters thereof are selected from the group consisting of malonic acid, succinic acid, suberic acid, azelaic acid, sebacic acid, undecamethylene dicarboxylic acid, terephthalic acid, isophthalic acid, hexahydroterephthalic acid, p,p'-diphenyl dicarboxylic acid, p,p' - diphenylmethane dicarboxylic acid, and monomethylester, monoethylester, monopropylester, monoamylester, dimethylester, diethylester, dipropylester and diamylester thereof.

6. The drawn composite filament according to claim 1, wherein said diamine is selected from the group consisting of ethylenediamine, hexamethylenediamine, nonamethylenediamine, decamtheylenediamine, m - xylylenediamine, p - xylylenediamine and piperazine.

7. The drawn composite flament according to claim 1, wherein said polyamide to be copolymerized with the polyesteramide forming ingredients is selected from the group consisting of poly - ε - capramide/polyhexamethyleneadipamide, polyhexamethyleneadipamide / polyhexamethylenesebacamide, poly - ε - capramide/polyhexamethyleneisophthalamide, poly - ε - capramide/polyhexamethyleneterephthalamide, poly - ε - capramide/polymetaxylyleneterephthalamide.

8. The drawn composite filament according to claim 1, wherein the homopolyamide and the copolyamide are bonded in an eccentric core and sheath realtion.

9. The drawn composite filament according to claim 1, wherein the homopolyamide and the copolyamide are bonded in an eccentric core and sheath relation.

References Cited
UNITED STATES PATENTS

| | | | |
|---|---|---|---|
| 3,118,011 | 1/1964 | Breen | 264—171 X |
| 3,162,619 | 12/1964 | Lang et al. | 260—78.3 X |
| 3,169,945 | 2/1965 | Hostettler | 260—78.3 X |
| 3,284,417 | 11/1966 | Hostettler | 260—78.3 X |
| 3,342,785 | 9/1967 | Blandard. | |
| 3,397,107 | 8/1968 | Kimura et al. | 161—173 |
| 3,418,200 | 12/1968 | Tanner | 161—177 |

ROBERT F. BURNETT, Primary Examiner

R. L. MAY, Assistant Examiner

U.S. Cl. X.R.

161—177, 173; 260—78, 78.3, 857; 264—171